United States Patent [19]
Madsen

[11] Patent Number: 5,469,026
[45] Date of Patent: Nov. 21, 1995

[54] METHOD AND APPARATUS FOR VF TUBE POWER SUPPLY

[75] Inventor: Wayne A. Madsen, Kokomo, Ind.

[73] Assignee: Delco Electronics Corporation, Kokomo, Ind.

[21] Appl. No.: 149,497

[22] Filed: Nov. 9, 1993

[51] Int. Cl.⁶ .............................. G09G 3/10; H05B 41/00
[52] U.S. Cl. .................. 315/169.4; 315/337; 315/168; 315/169.3; 345/75
[58] Field of Search ................ 315/169.1, 169.3, 315/169.4, 349, 337, 168, DIG. 1, 287, DIG. 4, DIG. 7, 291, 307, 334; 313/336, 346 R, 351; 345/75, 74, 76, 77

[56] References Cited

U.S. PATENT DOCUMENTS

| | | |
|---|---|---|
| 4,835,447 | 5/1989 | Mizuno et al. ................ 315/169.1 |
| 4,970,441 | 11/1990 | Lippmann et al. ................ 315/337 |
| 5,283,501 | 2/1994 | Zhu et al. ................ 315/169.3 |

*Primary Examiner*—Ali Neyzari
*Attorney, Agent, or Firm*—Jimmy L. Funke

[57] ABSTRACT

An efficient power supply for a vacuum fluorescent display having a battery or other unregulated source supplies the grid voltage directly from the battery and supplies the anode voltage via a step-up regulator. To eliminate apparent display brightness changes upon variation of battery voltage, the battery voltage and the anode voltage are fed back to the regulator, adjusting the regulated anode voltage inversely to the battery voltage. The direct coupling of battery to the grid eliminates the necessity of regulating or converting the grid voltage, allowing a smaller power supply to be used and minimizing heat losses.

3 Claims, 1 Drawing Sheet

METHOD AND APPARATUS FOR VF TUBE POWER SUPPLY

FIELD OF THE INVENTION

This invention relates to battery powered vacuum fluorescent (VF) displays and in particular to a method and apparatus for minimizing power conversion requirements for a VF power supply.

BACKGROUND OF THE INVENTION

In a typical VF tube, and anode and grid voltage is required to provide the accelerating potential for electrons, emitted from a heated filament, to strike a fluorescent material and cause light emission. The light intensity depends upon the accelerating potential which is a function of both filament-to-anode voltage and grid-to-anode voltage. In automotive vehicle use, for example, battery voltage is subject to variation over a range so that if the anode and grid voltage were allowed to vary with the battery voltage the accelerating potential and thus the light intensity would vary considerably. In many applications, the anode and grid voltages (which may be the same) are derived from a switching power supply or other means to boost and regulate the anode and grid voltages at the proper level. Maintaining a regulated voltage to the grids and anodes eliminates variations in emitted light intensity of the VF tube due to applied input voltage.

The drawback of converting battery voltage to a regulated voltage is the inefficiency of the regulator. Depending on the type of regulator, efficiency is typically 65 to 80%. The remainder is converted to heat which, in some cases requires a heat sink for thermal dissipation. If it were possible to sufficiently reduce the power conversion requirements, then the heat sink would be unnecessary in some cases. Such reduction may also allow the use of smaller power supply.

SUMMARY OF THE INVENTION

It is therefore an object of the invention to reduce the power consumption of VF power supplies by requiring less power to be converted. It is a further object to partially obviate the need for voltage regulation while maintaining consistent display brightness in spite of battery fluctuations.

In a typical VF tube, the amount of current required for the grids is approximately the same as or greater than the anode current. By supplying the grid current directly from the battery, the power conversion requirement is reduced at least by a factor of two, and the heat loss is likewise reduced.

The invention is carried out by supplying the grid of a VF tube directly from the battery (or other unregulated dc source) and regulating the anode voltage in a manner to offset the effect of battery voltage variation on the apparent brightness of the display. That is, if the grid voltage decreases, the anode voltage is increased by an amount to compensate for the grid, and vice versa, so that the net effect of battery fluctuation on light emission is negligible.

The anode voltage is supplied by a regulated source whose output voltage feedback contains a component from the unregulated input voltage source (battery) such that the anode voltage will be regulated inversely with the input voltage. If the proportion of input voltage feedback is appropriate, the fluctuations in input voltage (and thus grid voltage) will be compensated by the inverse voltage effect on the anode voltage. The result will be a fairly uniform light intensity over a broad range of input voltages. The basic benefit is that the amount of power converted by the regulating power supply is only a fraction of that required if grid power is converted in addition. This can reduce the size and complexity (and thus the cost) of the power supply. This technique is not applicable to those VF tube designs requiring grid voltages higher than the available unregulated source voltage.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
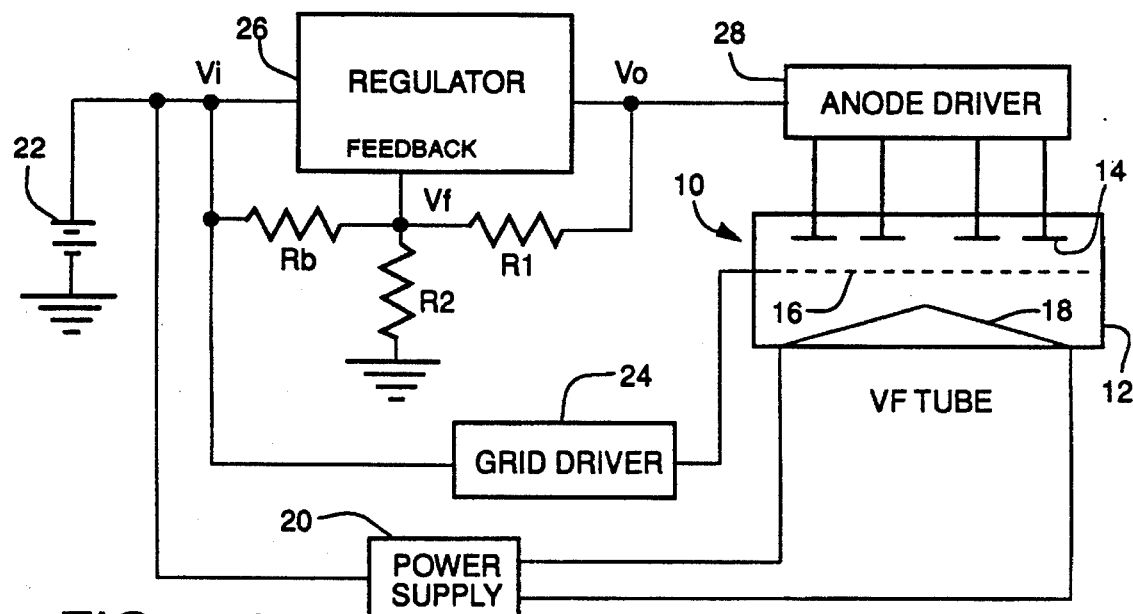
FIG. 1 is a block diagram of a VF power supply and a VF tube, according to the invention.

FIG. 1 illustrates a typical vacuum fluorescent display 10 and attendant power and control circuitry. The VF display 10 comprises a tube or envelope 12 containing an anode 14 having a plurality of anode elements, a grid 16 and a filament 18. As is well known, the filament 18 is a thin tungsten wire coated with an oxide material for the thermal emission of electrons when the wire is sufficiently heated. The grid 16 is an electrode which controls the thermal electrons emitted from the filament. It is positioned between the filament 18 and the anode 14. When the grid 16 is positive relative to the filament, electrons from the filament are accelerated toward the anode. The anode is comprised of conductive elements coated with a phosphor in a desired pattern. When the grid and the anode elements are positive, the thermal electrons collide with the phosphor to cause light emission. Thus by controlling the voltage on the anode elements and grid, the anode elements may be selectively illuminated. To assure that there is no light emission when not desired, an anode element (for selective control) or grid (for controlling all anode elements) is impressed with a voltage below a cutoff level, which may be the filament voltage or lower. In some cases a positive bias voltage is applied to the filament to assure that a ground voltage on the grid or anode is sufficient to stop light emission.

The filament 18 is supplied by a power supply 20 which in turn receives its input from a battery 22 or other unregulated source. The power supply may comprise, for example, a monolithic step-down regulator which yields a fixed dc voltage which in some applications is coupled directly to the filament 18; in other applications the dc voltage is converted to an ac voltage to drive the filament.

The grid 16 is supplied by the unregulated battery voltage through a grid driver 24 which switches the grid on and off (i.e. between battery voltage and ground) according to display control requirements, and may include multiplexing if several grid elements are used instead of one. In any event the grid voltage is the unregulated battery voltage and requires no converter or regulator.

The anode 14 is supplied from the battery 22 through a step-up regulator 26 which develops a regulated voltage higher than battery voltage, and through an anode driver 28 which selectively energizes anode elements according to the desired display pattern. The regulator 26 may be any of a variety of known regulators which have a feedback terminal for sensing the output voltage and controlling the output accordingly. The feedback signal is developed through a voltage divider comprising resistors R1 and R2 serially connected between the regulated output and ground, with the resistor junction coupled to the feedback terminal of the regulator. An additional resistor Rb is coupled between the junction point and the battery so that the battery voltage becomes a component in determining the regulated voltage level.

The regulator 26 maintains the feedback terminal at a fixed voltage Vf, say, 1.25 volts. In a conventional arrangement there is no resistor Rb, and the ratio of resistors R1 and R2 determine the output voltage Vo. That is, the regulator will drive the output to a value which results in a voltage divider junction voltage equal to the fixed voltage. The presence of the resistor Rb alters the voltage relationship such that the output voltage will increase if the input voltage Vi decreases, and vice versa. Specifically, recognizing that the current through R2 is the sum of the currents through R1 and Rb, the following relationship can be derived: Vo=R1 [(Vf/R2)−(Vi−Vf)/Rb]+Vf. Since Vf is fixed, Vo will vary inversely with Vi.

Figure 2:
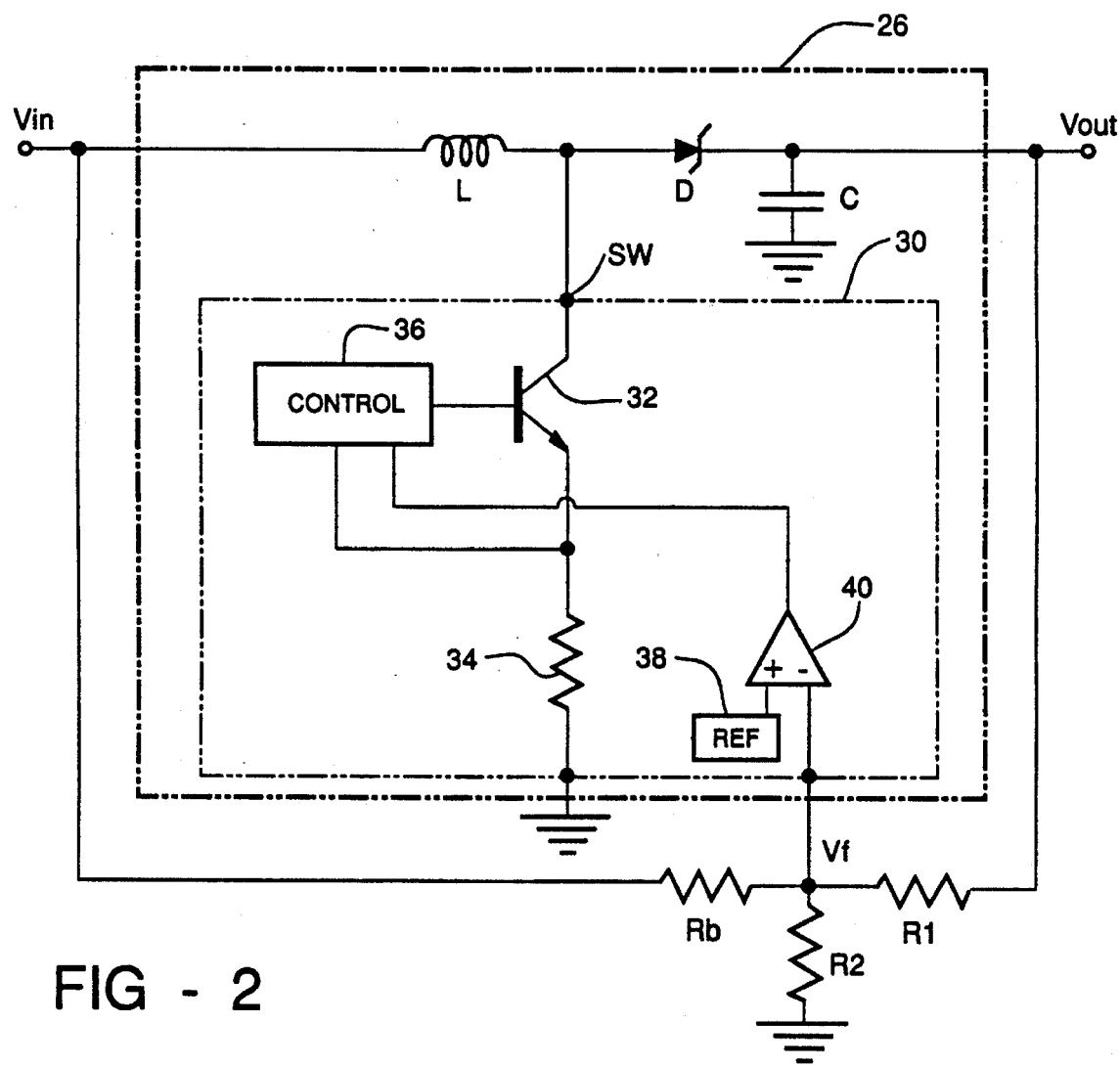
FIG. 2 is a block diagram of a regulator arrangement for the power supply of FIG. 1.

FIG. 2 shows an example of a power supply 26 which is based on a monolithic step-up regulator 30. The regulator, which may be step-up regulator LM1577 available from National Semiconductor Corp., contains a transistor switch 32 and a current sense resistor 34 connected serially between a switch terminal SW and ground, a control 36 for repetitively switching the transistor, a fixed internal reference voltage 38 and an error amplifier 40 for comparing the feedback voltage Vf to the reference voltage 38. The error amplifier and the voltage at the current sensing resistor provide control inputs to the control 36. External components comprise a simple inductor L connected between the voltage input and the switch terminal SW, a diode D connected between the switch terminal SW and the output, and a capacitor C between the output and ground. The feedback resistors R1, R2 and Rb are connected in the same manner as in FIG. 1.

In operation, The control 36 turns the transistor 32 on and off at a fixed frequency causing current to flow in the inductor L, storing energy in the inductor while the transistor is on. When the transistor switch 32 turns off, the inductor voltage flies above the input voltage Vi, discharging current through the diode D into the output capacitor C, thereby transferring energy to the output during switch off time. The output voltage Vo is controlled by the amount of energy transferred which, in turn, is controlled by modulating the peak inductor current. This is done by feeding back a portion of the output voltage Vo (as well as a portion of the input voltage Vi) to the error amplifier 40 which amplifies the difference between the feedback voltage and the reference voltage 38. The error amplifier output voltage is compared by the control 36 to a voltage proportional to the switch current determined by the current sensing resistor 34.

The specific relationship of the input voltage Vi and the output voltage Vo required for maintaining the display brightness is dependent on the particular VF tube design, and the feedback resistor values for achieving that relationship is readily determined empirically. For example, for a typical VF tube the resistor values Rb=37.4 kohm, R1=86.6 kohm, and R2=2 kohm, yield a display brightness which appears to be substantially constant over the range of 9 to 17 volts. As the input voltage Vi varies from 9 to 17 volts, the output voltage Vo varies linearly from 36.5 to 18 volts. Although the display intensity is very sensitive to grid and anode voltage, it is not critical to maintain a precisely constant intensity since the intensity must change by about a factor of two to effect the apparent brightness as seen by the eye. This phenomenon relaxes the requirement of determining the correct feedback resistor ratio.

Thus the overall power supply efficiency is enhanced over conventional arrangements by applying unregulated battery voltage to the grid, applying a regulated voltage to the anode, and controlling the anode voltage to vary inversely with the battery voltage in a manner to offset the effect of varying battery voltage on the display brightness. By having to convert one half or less power than prior VF display power supplies and generating less waste heat, smaller and less expensive power supplies may be required.

The embodiments of the invention in which an exclusive property or privilege is claimed are defined as follows:

1. In a vacuum fluorescent display having an anode, a grid, and a filament wherein display brightness is a function of grid voltage and anode voltage, an energy efficient power supply comprising:

an unregulated source providing a source voltage for the power supply, wherein the source voltage is subject to variation;

means for supplying unregulated source voltage to the grid, whereby the display brightness is subject to the level of grid voltage;

a regulate source supplied by the unregulated source and coupled to the anode for supplying a regulated voltage to the anode; and means for maintaining display brightness by adjusting the anode voltage to compensate for the effect of unregulated source voltage variations, wherein the means for maintaining display brightness includes:

regulator feedback means for determining the anode voltage; and first and second resistors coupling the unregulated voltage source and the anode, respectively, to the feedback means such that as the unregulated voltage changes in one direction the anode voltage is changed in the other direction to minimize the net effect of voltage changes on brightness.

2. The invention as described in claim 1, wherein the regulated source is a switched step-up voltage regulator.

3. The invention as described in claim 1, wherein the feedback means includes a regulated source feedback terminal which is maintained at a fixed voltage, with the feedback terminal coupled to ground by a third resistor, and the first and second resistors respectively coupling the unregulated voltage source and the anode to the feedback terminal.

* * * * *